United States Patent [19]
Ryzhov et al.

[11] Patent Number: 5,786,809
[45] Date of Patent: Jul. 28, 1998

[54] METHOD OF ENTRY OF SYMBOLIC INFORMATION INTO COMPUTER SYSTEM

[76] Inventors: Vladimir Alexandrovich Ryzhov, ul. Sholokhova, d.11, kv.10, 119634, Moscow; Sergei Viktorovich Trofimov, ul. Mosfilmovskaya, d.25, kv.41, 117330, Moscow, both of Russian Federation

[21] Appl. No.: 557,063
[22] PCT Filed: May 10, 1994
[86] PCT No.: PCT/RU94/00101
  § 371 Date: Mar. 18, 1996
  § 102(e) Date: Mar. 18, 1996
[87] PCT Pub. No.: WO94/27241
  PCT Pub. Date: Nov. 24, 1994

[30] Foreign Application Priority Data

May 12, 1993 [RU] Russian Federation ............ 93025896

[51] Int. Cl.$^6$ ........................................ G09G 5/00
[52] U.S. Cl. ........................... 345/168; 345/145; 345/146
[58] Field of Search .............................. 345/113, 114, 345/120, 121, 145, 146, 157, 168, 348, 349, 352; 364/188, 189

[56] References Cited

U.S. PATENT DOCUMENTS 5,105,375  4/1992  Lapeyre .................... 345/354
5,283,560  2/1994  Bartlett ..................... 345/113
5,581,243  12/1996  Ouellette et al. ........... 345/168

FOREIGN PATENT DOCUMENTS

| 457990A2 | 4/1990 | European Pat. Off. |
| 422577 | 4/1991 | European Pat. Off. |
| 422577A2 | 4/1991 | European Pat. Off. |
| 457990 | 11/1991 | European Pat. Off. |
| 464712 | 1/1992 | European Pat. Off. |
| 92/09944 | 6/1992 | WIPO |

*Primary Examiner*—Steven J. Saras
*Assistant Examiner*—Xu-Ming Wu
*Attorney, Agent, or Firm*—Knobbe, Martens, Olson & Bear, LLP

[57] ABSTRACT

The method includes the steps of transferring onto a screen a required set of symbols, which is positioned relative to the output position; their mutual allocation is fixed; the set is moved over the screen on the display to the predetermined positions synchronously with the output position while keeping their mutual space allocations; the predetermined symbol is entered into the computer system, after said set has been fixed, thereby performing the entry of symbols into the computer system.

7 Claims, 3 Drawing Sheets

METHOD OF ENTRY OF SYMBOLIC INFORMATION INTO COMPUTER SYSTEM

FIELD OF THE INVENTION

This invention relates to computer technology and, more particularly, the invention relates to a method of entering the symbolic information into a computer system.

BACKGROUND OF THE INVENTION

Known in the art is a method of entering symbolic information, in which use is made of a display and a keyboard for data exchange with a system unit.

In the process of entering the symbolic information into a computer system, the user is a source and the computer system is a receiver of the information. The information is also distributed inside the computer system between its components. The keyboard is a source for the system unit, which in this case is an information receiver. The system unit is a source of information for the display serving as an information receiver.

The keyboard is a set of keys marked by images of symbols. Each key has its own numerical code. The keyboard successively registers the facts of pressing the keys and transfers the sequence of the codes of the pressed keys to the system unit. The keys are of two types: character and functional. The character keys are used for entering characters (letters, digits, periods, comas, brackets, standard pictograms) into the system unit. These characters can then be printed or shown on the screen of a display. The functional keys are used for sending the control codes to the computer system.

In the process of entering the symbolic information into the computer system the display is an output device and is employed by the user to control the process of entry of the symbolic information. The display screen is divided into positions in which the characters can be shown. The screen is divided into a definite number of lines and columns of the positions. Thus, each position has its own coordinates: a number of a line and a number of a column. One of the characters is a space character or "blank" image. The clear display screen means that the space character is present in all positions. The display screen is provided with an allocated position which is called the output position. By alternating the operations of output of the characters and change of the output positions, one can form an image on the display screen in a definite way.

In order that the user can see and control the output position on the display screen, use is made of an item cursor or, as it is sometimes called, a text cursor. It is always placed at the output position. This cursor is often shown in the form of an underline mark which, when interposed on any other symbol, does not cover it.

The process of entering symbolic information consists of a train of pressing the keyboard keys by the user. Each pressing on the character key is accompanied by execution of a definite chain of operations in the computer system: the keyboard transmits the character code to the system unit, then the system unit generates an image of the respective character on the display screen in the output position, after that the system unit finds a new space for the output position and puts the text cursor there. After that the computer system is ready for reception of a new character code from the keyboard. All these operations, after the key has been pressed, are executed in real time, i.e. during such a short period of time that it seems instantaneous to the user.

In the process of conventional entry of a text into the IBM PC computer the input position on the screen marked by the cursor, after a regular input of a character and its output to the display screen, comes for one step to the right, as it is adopted in the European letter style, in which each new letter is written to the right from the written text. This is an operating mode in the so called "typewriter" style which is presently a standard procedure. With such a technology of the entry the user acquires a stable illusion that he enters the text directly to the display screen in the cursor position. Where it does not lead to controversy, this analogy may be used in the explanation. However, in the rigorous definitions in the description of an invention require strict formal verbalization.

The position of the cursor on the display screen is controlled by means of definite functional keys. For example, the keys marked with arrows can move the output position on the screen up, down, to the left or to the right. The user evaluates the change in the output position by the corresponding change in the cursor position. In addition, there is a set of other definite functional keys on the keyboard, which, for example, make it possible: to delete on the screen the character to the left from the current position of the cursor, if this character was entered erroneously; to use the insert or replacement mode when entering data; to put the output position to the beginning or end of the text and so on (Computer Basics, Input/Output (Understanding Computers), by the Editors of Time-Life Books, Time-Life Books, Alexandria, Va., 1985, 1986).

The practical work has proved that the most frequent operation with a textual information is editing the written text, when the user sees it on the display screen. In this case, the user must-read the text on the screen, put the cursor into definite fragments of the text and perform corrections, inserts and deletions.

The wide application of computers resulted in that they are now used by not only trained specialists, but ordinary users as well in quite different fields of human activity. The computer users spent most of their time operating with symbolic information. However, using the keyboard, the user encounters quite a number of problems. During the operation the user must regularly shift his eyes from the keyboard to the display and back, but, at the same time, he must switch over his attention looking for the required position on the screen and on the keyboard. The problem of switching the operator's attention between different information spaces (objects of attention) is complex for the operator and it is well known to the specialists. The continuous switching of the attention drastically decreases the speed of entry of symbolic information into a computer and leads to fast fatigue of the operator. On the other hand, now we have a lot of portable computers on the market, for which the normal keyboards are unsuitable due to their large size. However, the keyboard cannot be reduced a required size since the size of its keys and their disposition must correspond to the human fingers.

These disadvantages are partially eliminated in EP Application No. 294,518, cl. G06 F 3/033, 1987. This application discloses the entry of symbolic information into a computer system without a keyboard using a graphical display, a mouse manipulator with a button or another analog input device recording the manual movements and pressings of the buttons which are connected through a data bus to the computer system unit. According to this method, the usual keyboard is replaced by an image of a table of a set of symbols on the display screen, e.g., in the form of an ordinary keyboard which is called a virtual keyboard. To indicate a position on the display screen, use is made of an indicator referred to as a cursor made in the form of a definite image convenient for positioning and clearly seen on the screen, for example, in the form of a cross. The selection on the virtual keyboard of a definite key to be entered and its fixed, like pressing a key, is performed by moving the cursor by the manipulator to the key picture and pressing the manipulator button. Each key of the virtual keyboard is software-connected to the set of picktograms generated by the computer and displayed on the screen in definite positions and to the computer hardware. Having selected and pressed the key with a required image sample, the operator transfers the cursor to a definite position on the display screen, where the selected image sample must be allocated, and fixes up this position by pressing the manipulator button. As a result, the image of the selected sample appears in a definite position on the display screen.

The disadvantage of this method of entering the symbolic information into a computer system consists in a complex input procedure. At first, the operator selects a certain key on the virtual keyboard by moving the cursor to a required sector with the help of the manipulator. Then he manually sets an output position for the sample with the symbol image. With such a method of operation the operator must perform a complex procedure of manual positioning that needs permanent attention. It is well known to those skilled in the art that continuous concentration of attention causes a quick fatigue of the operator and reduces his workability. As a result, a number of the operator's errors increases and the operational speed drops down. Furthermore, with such a method the problem of switching the operator's attention between the working sector and the virtual keyboard on the display screen remains unsolved.

DISCLOSURE OF THE INVENTION

The basic object of the invention is to develop such a mutual setting of the output position on the display screen and the image of a set of required symbols in the process of entering the symbolic information into a computer system, which would solve the problem of switching the operator's attention between two information spaces: the output position and the set of required symbols. Another object is to minimize or eliminate all procedures of accurate manual positioning.

These objects are solved using a method of entering symbolic information into a computer system having a display screen with a cursor, which includes the steps of setting an output position of a predetermined symbol on the display screen, transferring to the displaying an image of a set of symbols including the predetermined symbol, selecting said symbol from said set, entering this symbol into the computer system and transferring its image to the display screen in the output position; according to the invention, the image of the set of symbols is positioned on the display screen relative to the output position, and their mutual position is fixed; the set is moved over the display screen to preset positions synchronously with the output position, while keeping their mutual disposition; said symbol is entered into the computer system after the image of said set has been fixed.

The advantage of the claimed method consists in that one can allocate the image of a set of symbols in the immediate vicinity of the position of output of the symbol on the screen and practically provide their joint transfer to the high-quality visual perception zone—the fovea zone in the operator's field of vision for maximum convenience in operation excluding the switching of the operator's attention from the set of symbols to the output position. The mutual disposition of the set of symbols and the position of output of the symbols on the screen can be selected depending on the operator's condition, working place illumination, display type, location of the operator relative to the screen, and other factors. The operator can always establish optimal allocation of the set of symbols relative to the output position. After that all movements of the image of the set of symbols on the display screen and output positions are performed while preserving the mutual spatial relations.

Therefore, during the operation the operator's attention is not scattered, the operator does not spend much time and efforts for switching his attention between the set of symbols of the output position and for searching the output position on the screen. The operator also needs no additional operations on positioning the image of the set of symbols on the display screen. This provides special capability to the operator of running the computer system in the "typewriter" mode stably concentrating the attention on the fragment of the text being edited while selecting the necessary symbols from the set and entering them into the computer system without switching the attention.

After the image of the set of symbols has been allocated on the display screen relative to the output position, it is expedient to move them synchronously while preserving the mutual spatial relation. This allows the operator to operate with the computer system in the "typewriter" mode concentrating his attention on the fragment of the text being edited and, at the same time, to entry the required symbols without switching over his attention.

The movement of the output position from one position to another is performed from the previous position to the next one only after the symbol has entered the preceding output position. This enables the operator to work with the computer system at any speed convenient for him in the "typewriter" mode taking no care on the positioning of the symbols being entered on the display screen.

In one embodiment of the invention the selection of the required symbol from the set of symbols is effected by means of an individual indicator, after the image of a set of symbols has been fixed. This makes it possible to use various soft- and hardware positioning means, e.g., a light pencil, a sensor display screen, etc. as an indicator. When the individual indicator is discretely allocated by the positions of the symbols in the set of symbols on the screen, the operator can perform the positioning procedure faster and simpler. When the cursor is used as an individual indicator, it is possible to control the computer system using a single manipulator.

The semi-transparent image of a set of symbols on the screen on the background of the picture on the visual display allows this method to be used in various application systems, for example, in the virtual reality systems.

All images on the visual display screen are made partially transparent on the background of the image of a set of symbols. This allows this method to be used in various application systems, for example, in the virtual reality systems.

BRIEF DESCRIPTION OF THE DRAWINGS

The invention is further described with examples of specific embodiments, which do not restrict the scope of the invention, and the appended drawings, in which.

THE BEST EMBODIMENT OF THE INVENTION

The claimed invention can be used in any presently known model of a computer system, for example, in the IBM personal computer, although it does not exclude the use of the invention in the models of other companies, as well as in portable computers, such as Laptop, Notebook, PDA, etc., and in various special-purpose computer systems having a visual display screen.

Figure 1:
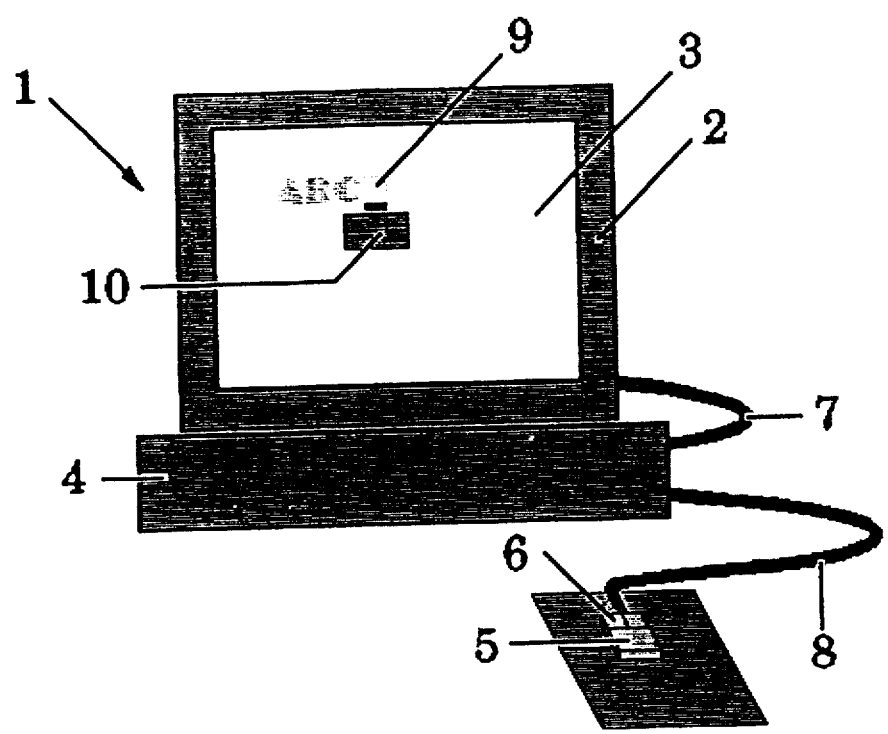
FIG. 1 is a configuration of a simple computer system in which the claimed method of entering the information is used.

Refer now to FIG. 1 showing a computer system. The computer system as a whole, denoted by reference numeral 1, has a display 2 with a screen 3, a system unit 4, a mouse manipulator 5 being an analog input device for recording the plane movements along two coordinates when pressing a button 6. The display 2 is connected to the system unit 4 through a cable 7 serving as a data bus. Shown on the screen 3 of the display 2 is an image of the output position 9 adjacent to a set of symbols denoted by numeral 10.

Figure 2:
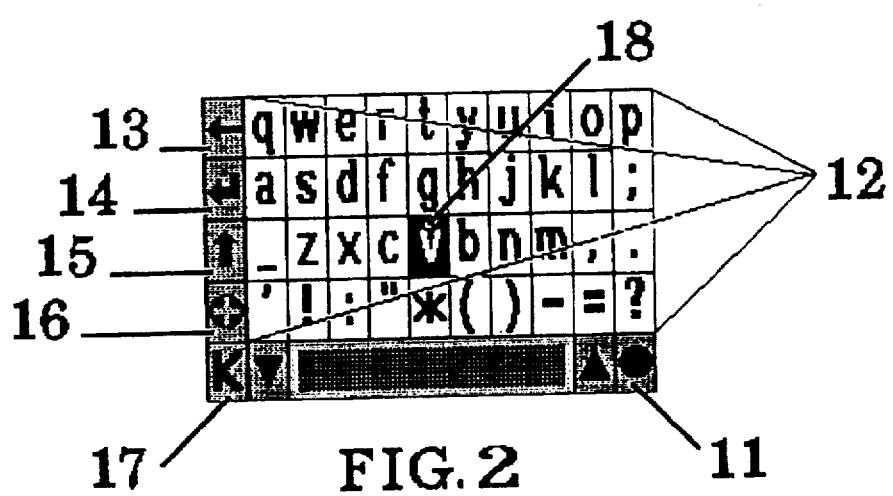
FIG. 2 is a graphical image of the basic set of symbols.

Consider FIG. 2. This figure is a detailed picture of the set 10 including the following elements: 11 is the image of clearing the screen 3 from the image of the set 10. 12 is the image of letters, digits and additional characters; 13 is the image of the "backspace" functional symbol implying the operation of deleting the image of a symbol in the previous output position 9 with simultaneous return of the output position 9 to its previous position on the screen 3; 14 is the image of the "Enter" functional symbol transferring the output position 9 to its initial position on the next line. 15 is the image of the "Caps Lock" functional symbol switching the computer system to the state of entering capital letters. 16 is the image of a functional symbol moving the image of the set 10 on the screen 3 from the state shown in FIG. 2 to the state shown in FIG. 3 with images of numbers and additional characters. 17 is the image of a functional symbol moving the image of the set 10 on the screen 3 from the state shown in FIG. 2 to the state shown in FIG. 4 with an image of Cyrillic characters. The discrete pointer 18 shows the current position on the set 10 image.

Figure 3:
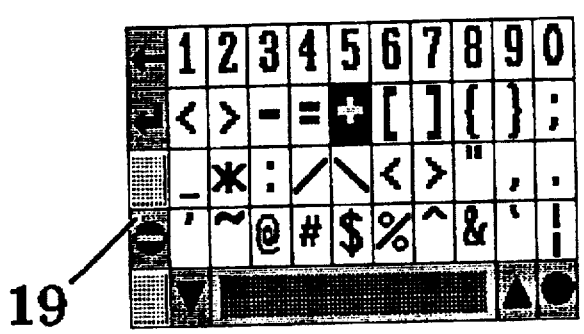
FIG. 3 is a graphical image of the set of symbols containing images of the numbers and additional characters.

Refer to FIG. 3. This figure shows a detailed image of the set 10 which includes numeral 19 denoting the image of a functional symbol moving on the screen 3 the set 10 image from the state shown in FIG. 3 to the state shown in FIG. 2.

Figure 4:
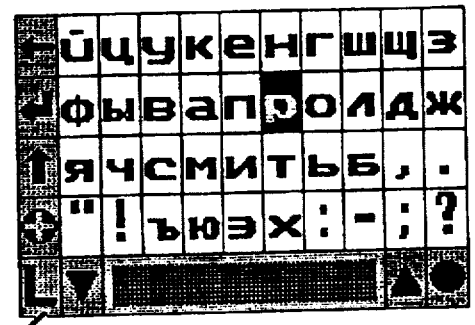
FIG. 4 is a graphical image of the set of symbols including Cyrillic characters.

Consider FIG. 4. This figure shows a detailed image of the set 10 which includes numeral 20 denoting the image of a functional symbol moving on the screen 3 the set 10 image from the state shown in FIG. 4 to the state shown in FIG. 2.

Figure 5:
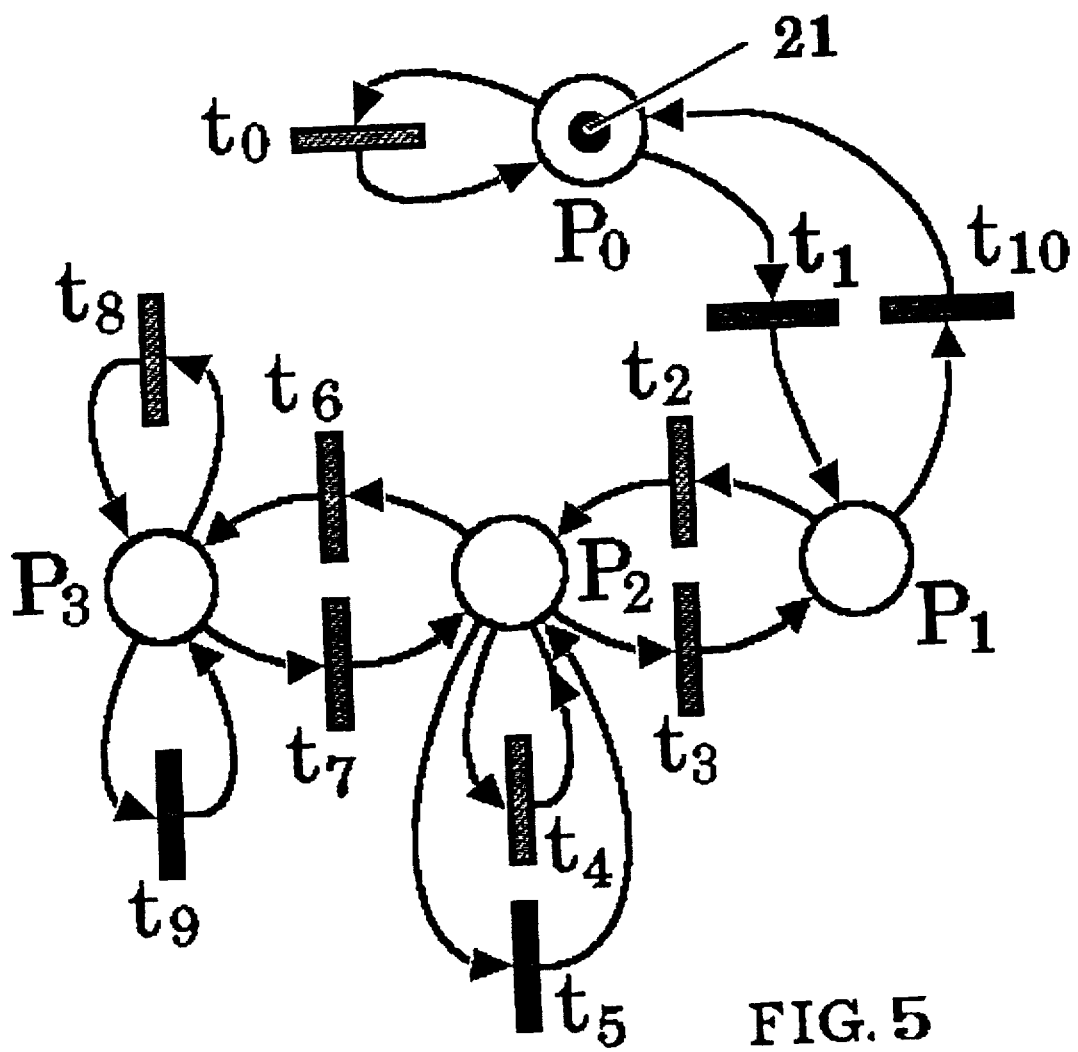
FIG. 5 is a functional diagram in the form of the Petri net determining the algorithm of operation of a computer system using the claimed method of entering the information.

FIG. 5 is a diagram of the Petri net, which is a functional model and formally describes the algorithm of the user's operation when entering the symbolic information into the computer system 1 (FIG. 1). The Petri net diagram consists of positions shown in the form of circles which may be explained as follows.

P0 (FIG. 5) is the state of the computer system 1, when the output position 9 on the screen 3 is shown by means of the text cursor, whereas the set 10 is not shown. In this state the input of symbols is impossible. The output position 9 marked by the cursor is moved over the positions of the screen 3 by means of the manipulator 5.

P1 is the state of the computer system 1, when on the screen 3 there is the set 10 image adjacent to the output position 9, and its allocation relative to the output position 9 is fixed. The pointer 18 (FIG. 2) is set on the deletion symbol 11.

P2 (FIG. 5) is the state of the computer system 1, when the output position 9 is shown on the screen 3 together with the set 10. In this state the input of symbols is possible. The pointer 18 (FIG. 2) can be set on a letter, number or additional character from the set 12 of printing symbols.

P3 is the state of the computer system 1, (FIG. 1) when the output position 9 is shown on the screen 3 together with the set 10. The pointer 18 (FIG. 2) is set on one of the functional symbols denoted by reference numerals 13, 14, 15, 16, 17, 19 (FIG. 3), 20 (FIG. 4).

Besides the positions, the Petri net diagram includes transitions shown in the form of rectangles, which indicate:

t0 is the operation of moving the text cursor pointing to the output position 9 (FIG. 1) on the screen 3 by means of the manipulator 5.

t1 is the operation of pressing the button 6 (FIG. 1) of the manipulator 5.

t2 is the operation of moving the pointer 18 (FIG. 2) from the position of the deletion symbol 11 to the position of a set of 12 characters.

t3 is the operation of moving the pointer 18 (FIG. 2) from the position of the set 12 to the position of the deletion symbol 11.

t4 is the operation of moving the pointer 18 (FIG. 2) over the positions of the characters 12.

t5 is the operation of pressing the button 6 (FIG. 1) of the manipulator 5, when superposing the pointer 18 (FIG. 2) on a definite character from the set 12. In this case, the image of the current character is moved to the output position 9 (FIG. 1) on the screen 3, while the output position 9 itself comes to the next position on the screen 3.

t6 is the operation of moving the pointer 18 (FIG. 2) from the position of the set 12 of characters to one of the positions of the set of functional symbols referred to as 13, 14, 15, 16, 17, 19 (FIG. 3), 20 (FIG. 4).

t7 is the operation of moving the pointer 18 (FIG. 2) from the position of the deletion symbol 11 to the position of the set 12 of printing symbols.

t8 (FIG. 5) is the operation of moving the pointer 18 (FIG. 2) within the set of functional symbols referred to as 13, 14, 15, 16, 17, 19 (FIG. 3), 20 (FIG. 4).

t9 is the operation of pressing the button 6 (FIG. 1) of the manipulator 5 when superposing the pointer 18 (FIG. 2) on a definite functional symbol from the set of functional symbols referred to as 13, 14, 15, 16, 17, 19 (FIG. 3), 20 (FIG. 4).

t10 (FIG. 5) is the operation of pressing the button 6 (FIG. 1) of the manipulator 5 when superposing the pointer 18 (FIG. 2) on the position of the deletion symbol 11. In the initial state the position P0 (FIG. 5) comprises a control element 21. In the network diagram this is a black ball inside the position circle.

The Petri net can be executed. The execution is controlled by the amount and distribution of the elements 21 in the positions. The transition is started by removing the elements from the input positions and by forming new elements put in its output positions (Peterson J., Petri Net Theory and Modelling of Systems. Prentis-Hall, Inc., Englewood Cliffts, N.J., 1981).

Consider one possible version of the work of a human operator with the simplest computer system using the claimed invention.

FIG. 5 shows a diagram of the Petri net in the initial state, when the control element 21 is in the position P0. In this state it is possible to perform either the transition t0 or transition t1. The execution of the transition t0 does not remove the control element 21 from the position P0, as it is clear from the diagram.

In practice this means that the user sees the output position 9 shown by the text cursor on the screen 3 (FIG. 1), while the set 10 is not shown. In this state the input of symbols is impossible. Using the manipulator 5, the user sets the output position 9 marked by the cursor in a definite section of the screen 3. After that, the user presses the button 6 of the manipulator 5 to enter the symbolic information. Then the image of the set 10 appears on the screen 3 near the output position 9, while the pointer 18 (FIG. 2) points to the position of the deletion symbol 11 in the set 10 (FIG. 1). This corresponds to the execution of the transition t1 in the Petri diagram (FIG. 5). The element 21 is removed from the position P0 and put in the position P1.

In this state the execution of two transitions t2 and t10 is possible. The transition t10 returns the element 21 back to the position P0 while the transition t2 transfers the element 21 to the position P2.

For the operator this implies the following. He may press the button 6 (FIG. 1) and delete the image of the set 10 from the screen 3. He will see the cursor alone pointing to the output position 9 which can be reinstalled to another required position by means of the manipulator 5. On the other hand, the user can transfer the pointer 18 (FIG. 2) to the set of characters 12.

When the element 21 (FIG. 5) is in the position P2, only three transitions t4, t5 and t6 are accessible for execution. The execution of the transition t4 is the operation of moving the pointer 18 (FIG. 2) over the positions of the characters 12 (FIG. 2), and this permits the user to select a required character to be entered. This operation can be executed many times. Looking on the Petri net diagram (FIG. 5), we may see that the control element 21 is always in the position P2.

To execute the transition t5, the user presses the button 6 (FIG. 1) when superposing the pointer 18 (FIG. 2) on a definite character from the set 12. In so doing the image is transferred from the selected character to the output position 9 (FIG. 1) on the screen 3, while the output position 9 itself comes to the next position. In this case, the image of the set 10 also comes to a new position on the screen 3 while keeping its position unchanged with respect to the output position 9. This operation can be executed repeatedly leaving the element 21 (FIG. 5) in the position P2. In other words, the system operates in the "typewriter" mode, when the characters are repeatedly entered into the system with their output to the screen 3 (FIG. 1).

The execution of t6 (FIG. 5) means that the user decided to use any functional symbol from the set of positions 13 (FIG. 2), 14, 15, 16, 17, 19 (FIG. 3), 20 (FIG. 4). The user transferred the pointer 18 (FIG. 2) from the positions of the set 12. In the Petri net diagram the transition t6 (FIG. 5) moves the control element 21 to the position P3.

When the element 21 is in the position P2, only three transitions t7, t8 and t9 are accessible for execution.

The execution of t7 transfers the control element 21 to the position P2.

The execution of t8 implies the motion of the pointer 18 (FIG. 2) within the set of functional symbols numbered as 13 (FIG. 2), 14, 15, 16, 17, 19 (FIG. 3), 20 (FIG. 4). This operation can be repeated many times while the control element 21 (FIG. 5) remains in the position P2.

The execution of t9 implies pressing the button 6 (FIG. 1), when the pointer 18 (FIG. 2) points to a definite functional symbol in the set of functional symbols, designated as 13, 14, 15, 16, 17, 19 (FIG. 3), 20 (FIG. 4).

We described one specific version of the operation of the computer system based on the claimed invention. For those skilled in the art it is evident that various embodiments of the Petri net diagram shown in FIG. 5 are possible. The algorithm of the computer system determined by the diagram may be partially modified without departing from the scope of the claimed method. For example, the arc extending from the transition t1 can be directed to the position P2. This means that the pointer 18 (FIG. 2) will be set on a definite symbol from the st 12 when calling the set 10 (FIG. 1) to the screen 3. In a similar way, the arc extending from the transition t1 (FIG. 5) can be directed to the position P3. The set of functional symbols in the positions 13 (FIG. 2), 14, 15, 16, 17, 19 (FIG. 3), 20 (FIG. 4) can also be modified.

Given above are various embodiments of the invention, which, as it is evident to those skilled in the art, can be modified and changed within the scope of the claims appended to this specification. For example, it is clear that the computer memory can store a plurality of images of various sets of symbols depending on the national alphabets, types of written language and applied fields. On the other hand, the image of the set 10 (FIG. 1) of symbols can be presented in the form of various tables similar to FIGS. 2, 3, 4, or in the form of a circular diagram, or in the form of a compact set of polygons, or in the form of an image of a conventional typewriter keyboard. The set 10 (FIG. 1) can also be presented in the form of an artistic picture. The user gets additional convenience due to a possibility of changing the size of the image of the set 10 by scaling on the screen 3, as well as by varying the brightness and color of the set 10 image.

One of the important advantages of the claimed invention consists in a quick and simple changeover of the operating mode of the computer system 1 from the state P0 (FIG. 5) to the state P1 and back by means of simple control actions on the manipulator 5 (FIG. 1). This possibility is put into the basis of the paradigm of a complex text cursor having two states. As mentioned above, the editing of an available text is the most frequent type of work with the textual information, when the user sees this text on the display screen. Two procedures are typical in the editing mode: (a) review and reading; strolling the text on the screen 3 of the display 2 by means of the manipulator; setting the text cursor to a required place in the text, or, more precisely, to the output position 9 on the screen 3, and (b) entry of the symbolic information itself. These procedures are executed by the user in the states P0 (FIG. 5) and P1 respectively. To realize this operating mode, it is expedient to use the set of symbols 10 (FIG. 1) including the symbol 11 (FIG. 2) for removing the image of the set of symbols on the display screen. It is obvious that the computer system 1 (FIG. 1) can be switched from the state P0 (FIG. 5) to the state P1 in different ways. For example, this can be done by pressing the button 6 (FIG. 1) of the manipulator 5, or by pressing a definite key of the computer system 1. The proposed paradigm of a complex text cursor having two states is a new conception enabling one to qualitatively expand the possibilities of the unified user's interface with computer systems.

Industrial Applicability

The claimed method was realized in a computer system using the IBM PC AT 386, DX and AT 486.

We claim:

1. A method of entry of information into a computer system having a screen of a display, comprising the steps of:

setting an output position of a predetermined symbol on said screen, outputting an image of a set of symbols including the predetermined symbol onto said screen at a position which has a fixed relationship to said output position, selecting said predetermined symbol from said set, entering said predetermined symbol into said computer system after said image of said set of symbols has been output in said fixed positional relationship, outputting an image of said predetermined symbol onto said screen in said output position moving said output position on said screen to a new position, and moving said image of said set of symbols synchronously with said moving of said output position on said screen to maintain said fixed positional relationship between said image of said set of symbols and said output position.

2. A method as defined in claim 1, wherein said moving of said output position on said screen to a new position occurs only after said symbol has been entered in the previous output position.

3. A method as defined in claim 1, wherein said selecting of said predetermined symbol from said set comprises using a pointer, after said image of the set of symbols has been displayed.

4. A method as defined in claim 3, wherein said pointer comprises a cursor.

5. A method as defined in claim 1, wherein said image of said set of symbols is partially transparent and superimposed on the image on said screen.

6. A method as defined in claim 1, additionally comprising: making all images on said screen partially transparent and superimposed on said image of said set of symbols.

7. A method as defined in claim 1, wherein said selecting of said predetermined symbol comprises superimposing the image of the predetermined symbol within said image of said set of symbols onto said output position by moving said image of said set of symbols.

* * * * *